(No Model.) 2 Sheets—Sheet 1.

C. G. WHITAKER.
VEHICLE WHEEL.

No. 603,865. Patented May 10, 1898.

Witnesses
J. D. Goxfield
H. I. Clemons

Inventor
Charles Godfrey Whitaker
By Chapin
Attorneys

THE NORRIS PETERS CO., PHOTO-LITHO., WASHINGTON, D. C.

(No Model.)  2 Sheets—Sheet 2.
C. G. WHITAKER.
VEHICLE WHEEL.
No. 603,865. Patented May 10, 1898.
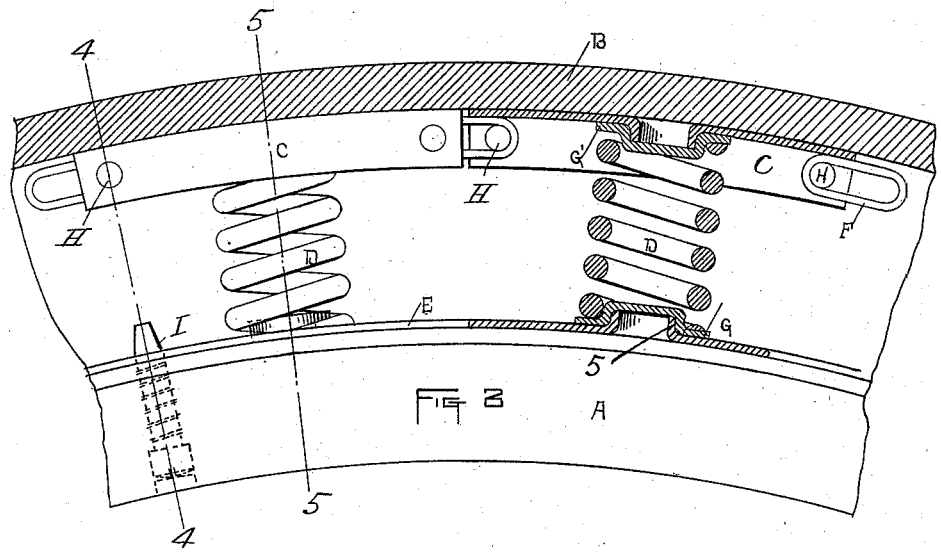
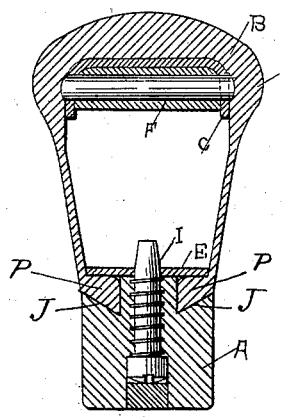
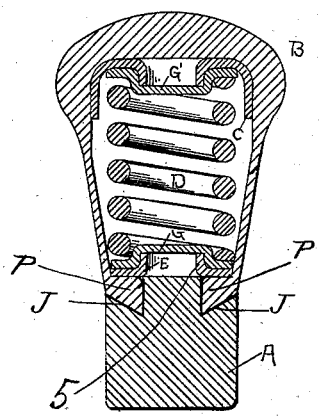
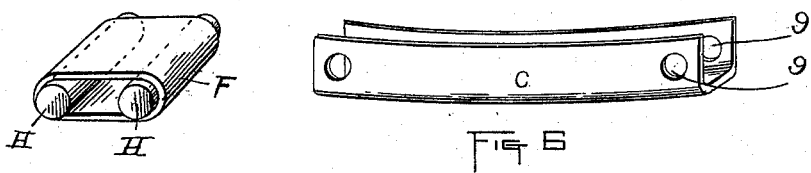
WITNESSES:
INVENTOR
Charles Godfrey Whitaker
BY
ATTORNEYS.

UNITED STATES PATENT OFFICE.

CHARLES GODFREY WHITAKER, OF WESTFIELD, MASSACHUSETTS.

VEHICLE-WHEEL.

SPECIFICATION forming part of Letters Patent No. 603,865, dated May 10, 1898.

Application filed July 9, 1897. Serial No. 643,945. (No model.)

*To all whom it may concern:*

Be it known that I, CHARLES GODFREY WHITAKER, a citizen of the United States of America, residing at Westfield, in the county of Hampden and State of Massachusetts, have invented new and useful Improvements in Vehicle-Wheels, of which the following is a specification.

This invention relates to wheels for vehicles, the object being to provide an improved wheel of this class having an elastic perimeter; and the invention consists in the peculiar construction and arrangement of the elastically-acting wheel parts which are applied to the felly of the wheel, all as hereinafter fully described, and more particularly pointed out in the claims.

Figure 1:
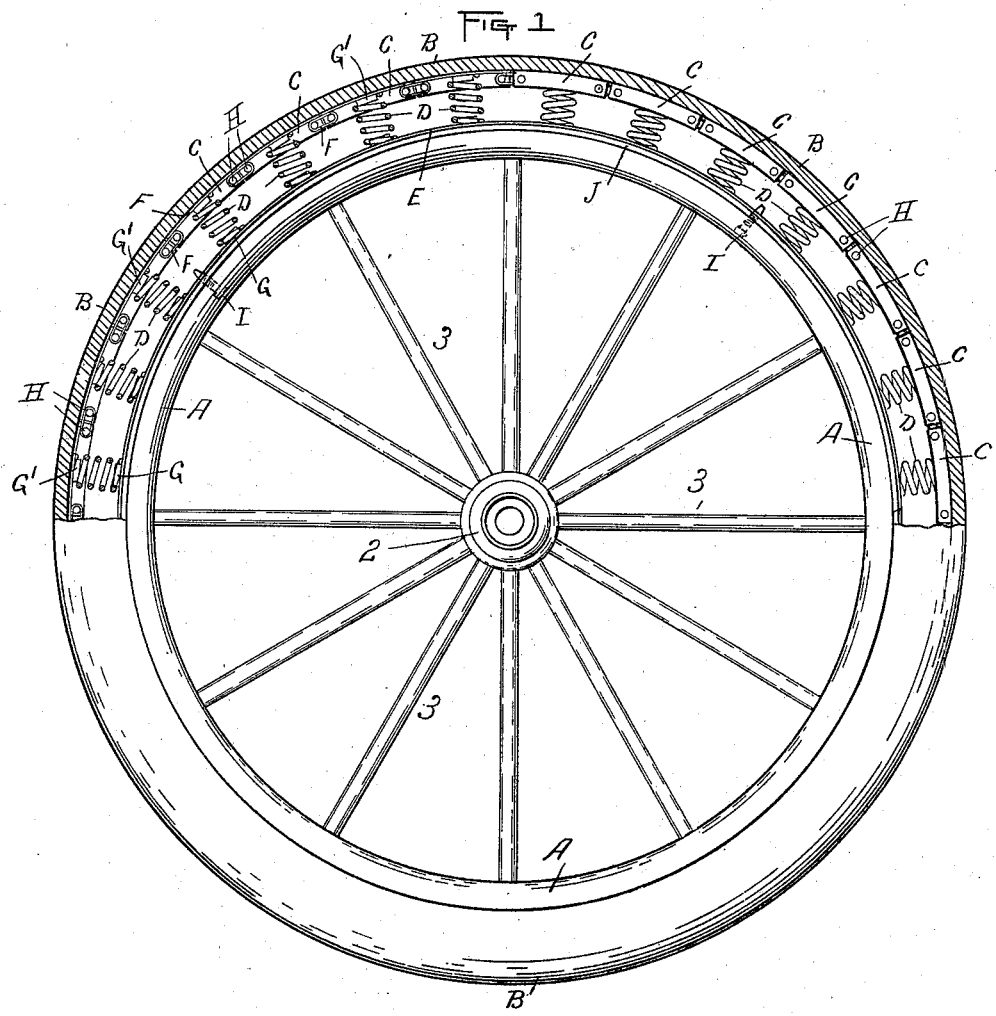
Figure 2:
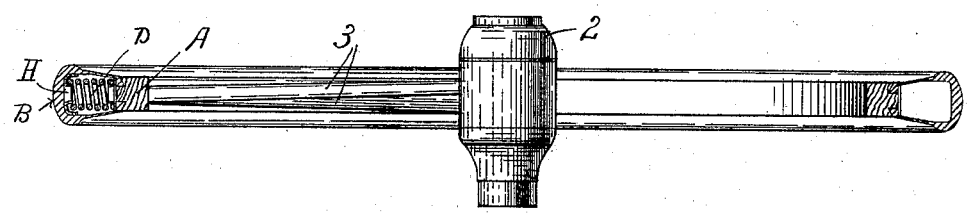

In the drawings forming part of this specification, Figure 1 is a side elevation of a vehicle-wheel embodying my improvements, said wheel having a portion thereof beyond the felly broken away. Fig. 2 is a sectional view of the felly of the wheel and of the parts applied thereto. Figs. 3, 4, 5, and 6 are enlarged views, as compared with the preceding figures, respectively showing—Fig. 3, a portion of the felly, parts of the elastic elements and rim parts applied thereto, and a section of the outer covering or case inclosing said rim and other parts; Fig. 4, a sectional view on line 4 4, Fig. 3; Fig. 5, a sectional view on line 5 5, Fig. 3; and Fig. 6, a perspective view of a section of the rim of the wheel. Fig. 7 is a perspective view of one of the tubular links of the wheel-rim, showing the link and rim connecting pins therein.

Referring to the drawings, 2 and 3 indicate a hub and the spokes of a vehicle-wheel, respectively. The felly A of the wheel (preferably of the ordinary wooden construction) is applied and secured to the spokes thereof in any well-known manner and has in its opposite borders the annular grooves J J. To said felly A is applied a metal band E, firmly secured thereon in any suitable manner, but preferably by several screws I, one of which is shown in Fig. 4 screwed into the felly and having its point projecting through said metal band. The heads of said screws may enter the felly, as shown, or be flush with the inside of the latter. At intervals in said metal band, about centrally between its borders, holes are punched therein in such manner as to throw up a tube-like projection 5 around the border of each of said holes. Said tube-like projections 5 on the face of the felly serve, as below described, as spring steadying or holding elements or means, and it is obvious that if said felly be of metallic construction the said spring-steadying elements may consist of pins driven into the felly or be made integral therewith; but for the purpose of lightness in the wheel it is preferable to apply said band E to a felly of wood and form said projections 5 thereon, as described.

Each of the rim-sections is substantially of the form shown in Figs. 6 and 3 and is indicated by C and has a base and depending borders on the opposite edges of said base, and each has a hole punched through its base about midway of its ends, (see Fig. 5,) forming a tube-like spring-holding projection 7 around its border, substantially the same as the aforesaid projection 5 around the said holes through said band E. In the operative arrangement of the parts of the wheel, as fully explained below, the said tube-like rims 5 and 7 are opposite each other, as shown in Figs. 3 and 5 and for a purpose below described. Each of said rim-sections C has two bolt or pin holes 9 in corresponding positions transversely through the depending opposite sides thereof, as shown. The said rim-sections are connected in position around but at a certain distance beyond said felly A and with slightly-separated ends, as shown in Fig. 3, by means of a tubular link F, between the adjoining ends of said rim-sections, and a pin H, passing through each of said ends and the opposite ends of said link, forming free connections therebetween. This manner of connecting said rim-sections by said free connections, one to the other, provides for a certain degree of independent movement of the individual sections toward and from the felly A and a corresponding action of each spring D, whereby the tread of the wheel when brought in forcible contact with an object on a road is capable of deflection at its point of such contact more or less independently of the adjoining portions of the tread. Between each of said rim-sections C and the said band E, which is fixed around the felly A, is placed a well-tempered spiral or other spring D. The extremities of said springs are seated indirectly on the felly A and on the base of the rim-section C, as below described. The opposite ends of each of said springs D are engaged by the said tube-like rims or projections 7 and 5, respectively. On the base of said rim-sections C and on said band E and between each end of said spring and the rim-section C and the said band E is placed a cushion-like washer G, of rawhide or other tough matter, which washers form cushions for the ends of each spring and constitute noiseless or sound-preventing bearings therefor. Said cushion-like washers in a construction of this class, in which under ordinary circumstances the ends of the spring sustaining a wheel-section would bear directly upon a metallic surface, prevent any disagreeable noise caused by the abrasion of the end of said spring against a metallic surface. Said washers when compressed between the ends of said spring and said upstanding rims or projections 5 and 7 take the form shown in Figs. 2 and 5, whereby they operatively retain their places. The said rim-sections C, springs D, links F, and pins H are assembled in operative position on the felly of the wheel as follows: The sections C are first united end to end by means of the links F and pins H, said pins being riveted at the ends after the manner of a chain. This rim is then mounted upon the felly A, and, starting at one end, it is placed in position with springs and washers in place, as shown in Fig. 3, they being held in proper position by means of clamps bearing upon the rim-sections C. When all are thus in place, the two ends of the rim are brought together and united, forming an endless flexible rim. When the clamps are removed, the rim assumes its extreme diameter under the tension of the springs. Thus the sections of the entire wheel-rim are applied to the felly with the compressed springs D therebetween, as described and as illustrated in Fig. 1. The said felly A has said two grooves J J formed in its opposite outer borders, which have the sides thereof, which are in the plane of the bearing-surface of the felly, covered by portions of said metallic band E, which is secured on the felly, as described. The grooves J thus formed have each an open side on the opposite sides of the felly, which is narrower than the base of the groove, for the purpose below described.

The above-described parts of the wheel which are applied to the felly are tightly inclosed in a combined sheath and tread B, of rubber or similar flexible or elastic material, of trough form in cross-section, as shown in Figs. 4 and 5, having on the borders thereof ribs P P of substantially corresponding form to said grooves J J, but made of sufficiently full size, so that when said sheath is placed upon the felly, as in said Figs. 4 and 5, and said ribs P P are entered into said grooves the sides of the sheath are firmly locked to the felly, and the tread thereof, which lies over said rim-sections, is tightly drawn against the latter. To insert the said ribs P of the sheath into the grooves J J, the screws I are withdrawn from it and the metallic band E is moved to one side, thereby alternately increasing the opening in the annular grooves and permitting one side of the rib to be put in place, and the metal band E is then pushed over to the opposite side or otherwise moved on or from the felly, opening the opposite annular groove, into which the second rib of the tire is then placed, and the metallic band is again centrally placed on the felly (partially covering both grooves, as shown) and there fixed by means of said screws I, operated from the inner surface of the wooden felly. In inserting the ribs P P in the grooves J J without moving the band, &c., the tire is compressed, thus permitting the triangular ribs to be bent under till they enter the groove point first, and being pressed in beyond the point of their greatest axis the release of the tire draws the rib at an angle to the direction of entry, causing it to turn in the groove in such a manner as to lock itself in. Said sheath and tread enveloping said rim-sections and springs and band E protects the said inclosed parts from moisture and dirt and affords the spring devices within it the utmost freedom of action when the wheel is rolling over rough and uneven roads, whereby the effect of a pneumatic tire is by mechanical means produced in a vehicle on which wheels of the within-described construction are applied.

Having thus described my invention, what I claim, and desire to secure by Letters Patent, is—

1. In a vehicle-wheel, an elastic perimeter comprising a sectional rim, links and pins connecting said sections, coiled springs interposed between said rim-sections and the felly of the wheel, and a flexible tread enveloping said sections and springs, and by its borders engaging the said felly, substantially as described.

2. In a vehicle-wheel, an elastic perimeter comprising a series of rim-sections, each section having a spring-engaging base and depending borders on the opposite edges of said base, links and pins connecting said sections, a spring interposed between each of said rim-sections and the felly of the wheel, and a flexible tread enveloping said sections and springs, and by its borders engaging said felly, substantially as described.

3. In a vehicle-wheel, a felly therefor having spring-holding projections on its face and an elastic perimeter comprising a series of rim-sections, each section having a base and depending borders on the opposite edges of said base, and a spring-holding projection on said base, a spring interposed between each of said rim-sections and said felly and having said spring-holding projections entering the ends thereof, fibrous washers interposed between the ends of said springs and said perimeter and felly, connections between the adjoining ends of said sections consisting of links and pins, whereby one or more sections may move independently toward and from said felly, and a flexible tread enveloping said sections and springs, and by its borders engaging said felly, substantially as set forth.

CHARLES GODFREY WHITAKER.

Witnesses:
   H. A. CHAPIN,
   K. I. CLEMONS.